United States Patent
Saini et al.

(10) Patent No.: US 10,773,254 B2
(45) Date of Patent: *Sep. 15, 2020

(54) ANION EXCHANGE STATIONARY PHASES BASED ON CROSSLINKED HYDROXYALKYLAMINE LAYER AND GLYCIDOL

(71) Applicant: DIONEX CORPORATION, Sunnyvale, CA (US)

(72) Inventors: Charanjit Saini, Fremont, CA (US); Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/928,384

(22) Filed: Mar. 22, 2018

(65) Prior Publication Data

US 2019/0291094 A1 Sep. 26, 2019

(51) Int. Cl.
| | | |
|---|---|---|
| *B01J 41/20* | (2006.01) | |
| *B01J 41/13* | (2017.01) | |
| *B01J 41/04* | (2017.01) | |
| *C08J 5/22* | (2006.01) | |
| *B01D 15/36* | (2006.01) | |

(52) U.S. Cl.
CPC ............ *B01J 41/20* (2013.01); *B01D 15/363* (2013.01); *B01J 41/04* (2013.01); *B01J 41/13* (2017.01); *C08J 5/2256* (2013.01); *C08J 5/2287* (2013.01); *C08J 2363/00* (2013.01)

(58) Field of Classification Search
CPC ... B01J 41/20; B01J 41/13; B01J 41/04; C08J 5/2287; C08J 5/2256; C08J 2363/00; B01D 15/363
USPC ....................................................... 521/34
See application file for complete search history.

(56) References Cited

U.S. PATENT DOCUMENTS

| | | | |
|---|---|---|---|
| 7,291,395 B2* | 11/2007 | Pohl .................. | B01J 20/28014 427/221 |
| 7,468,130 B2 | 12/2008 | Liu et al. | |
| 9,034,447 B2 | 5/2015 | Pohl et al. | |
| 9,034,477 B2 | 5/2015 | Amici et al. | |
| 9,132,364 B2 | 9/2015 | Srinivasan et al. | |
| 9,283,494 B2 | 3/2016 | Pohl et al. | |
| 9,486,799 B2 | 11/2016 | Pohl | |
| 2005/0181224 A1 | 8/2005 | Pohl et al. | |
| 2006/0180549 A1 | 8/2006 | Liu et al. | |
| 2007/0062854 A1 | 3/2007 | Pohl et al. | |
| 2009/0130767 A1 | 5/2009 | Liu et al. | |
| 2011/0210055 A1 | 9/2011 | Srinivasan et al. | |
| 2012/0231195 A1* | 9/2012 | Pohl .................. | B01J 39/26 428/36.91 |
| 2014/0069870 A1* | 3/2014 | Pohl .................. | B01J 20/288 210/656 |
| 2016/0370329 A1 | 12/2016 | Jayaraman et al. | |

FOREIGN PATENT DOCUMENTS

| | | |
|---|---|---|
| WO | WO-2011106720 A2 | 9/2011 |
| WO | WO-2012125493 A1 | 9/2012 |
| WO | WO-2014043174 A1 | 3/2014 |

OTHER PUBLICATIONS

Extended European Search Report for Application No. 18204155.8, dated Mar. 14, 2019, 8 pages.
Extended European Search Report for Application No. 19164245.3, dated Jul. 23, 2019, 9 pages.
Extended European Search Report for Application No. 19164250.3, dated Jul. 23, 2019, 8 pages.
Dionex Data Sheet, IonPac AS24 AG24, 34 pgs., Dec. 2008.
Dionex Data Sheet, IonPac AS24 Anion-Exchange Column, 5 pgs., Dec. 22, 2008.
Dionex IonPac AS26 Column Product Manual, 065444-03, 49 pgs., Jun. 2013.
IonPac AS24A Anion-Exchange Column, Dionex Data Sheet 70335, 6 pgs., 2013.
IonPac AS24A Column, Dionex Product Manual, 065464-04, 55 pgs., May 2013.
IonPac AS26 Anion-Exchange Column, 70830 Data Sheet, 6 pgs., 2013.

* cited by examiner

*Primary Examiner* — Michael Bernshteyn
(74) *Attorney, Agent, or Firm* — Timothy J. Ohara

(57) ABSTRACT

An anion exchange stationary phase includes a negatively charged substrate particle, a base condensation polymer layer, a crosslinked ethanolamine condensation polymer, and a glycidol condensation layer. The crosslinked ethanolamine condensation polymer layer can be covalently attached to the base condensation polymer layer. The crosslinked ethanolamine condensation polymer layer can be formed by a condensation reaction product of a polyepoxide compound and ethanolamine. The glycidol condensation layer can be formed by the treatment of glycidol. The anion exchange stationary phase are suitable for separating a variety of haloacetic acids and common inorganic anions in a single chromatographic run in less than 20 to 30 minutes.

4 Claims, 12 Drawing Sheets

ANION EXCHANGE STATIONARY PHASES BASED ON CROSSLINKED HYDROXYALKYLAMINE LAYER AND GLYCIDOL

FIELD OF THE INVENTION

The invention generally relates to anion exchange stationary phases based on a crosslinked hydroxyalkylamine layer and glycidol for applications such as separating samples that include anions, and in particular a combination of haloacetic acids and inorganic anions in a single chromatographic run.

BACKGROUND

Chromatography is a widely used analytical technique for the chemical analysis and separation of molecules. Chromatography involves the separation of one or more analyte species from other matrix components present in a sample. A stationary phase of a chromatography column is typically selected so that there is an interaction with the analyte. Such interactions can be ionic, hydrophilic, hydrophobic, or combinations thereof. For example, the stationary phase can be derivatized with ionic moieties that ideally will bind to ionic analytes and matrix components with varying levels of affinity. A mobile phase is percolated through the stationary phase and competes with the analyte and matrix components for binding to the ionic moieties. The mobile phase or eluent are terms used to describe a liquid solvent or buffer solution that is pumped into a chromatography column inlet. During this competition, the analyte and matrix components will elute off of the stationary phase as a function of time and then be subsequently detected at a detector. Examples of some typical detectors are a conductivity detector, a UV-VIS spectrophotometer, and a mass spectrometer. Over the years, chromatography has developed into a powerful analytical tool that is useful for creating a healthier, cleaner, and safer environment where complex sample mixtures can be separated and analyzed for various industries such as water quality, environmental monitoring, food analysis, pharmaceutical, and biotechnology.

In regards to water quality, haloacetic acids are a group of disinfection byproducts resulting from the reaction between the naturally occurring organic matters and the disinfectants used during water treatment. The presence of haloacetic acids in drinking water has been linked to several adverse effects including bladder, kidney, and colorectal cancer.

In addition, a group of common inorganic anions are routinely monitored in drinking water. For example, the National Primary Drinking Water Standards in the United States specify a Maximum Contaminant Level (MCL) for a number of inorganic anions such as fluoride, nitrite, and nitrate. The MCLs are specified to minimize potential health effects arising from the ingestion of these anions in drinking water. High levels of fluoride cause skeletal and dental fluorosis, and nitrite and nitrate can cause methemoglobulinemia, which can be fatal to infants. Other common anions, such as chloride and sulfate, are considered secondary contaminants. The National Secondary Drinking Water Standards in the U.S. are guidelines regarding taste, odor, color, and certain aesthetic characteristics. Although these guidelines are not federally enforced, they are recommended to all states as reasonable goals and many states adopt their own regulations governing these contaminants Under certain circumstances, anion exchange stationary phases can have different affinity values to haloacetic acids and common inorganic anions, which makes analysis of both types of chemicals difficult during a single chromatographic run. When the retention times of various haloacetic acids and common inorganic anions are sufficiently different, the duration of a single chromatographic run can be unacceptably long. To simplify the analysis of water quality for more than one group of anions, Applicant believes that there is a need for anion exchange stationary phases that require relatively low eluent concentrations and can separate and resolve both haloacetic acids and common inorganic anions in a single relatively fast chromatographic run.

SUMMARY

A first embodiment of an anion exchange stationary phase includes a negatively charged substrate particle, a base condensation polymer layer, a crosslinked ethanolamine condensation polymer, and a glycidol condensation layer. The base condensation polymer layer can be attached to the negatively charged substrate particle. The base condensation polymer layer includes quaternary amines, ether groups, and hydroxy groups, in which at least a portion of the hydroxy groups is spaced from the quaternary amines by a first two carbon spacer. The crosslinked ethanolamine condensation polymer layer can be covalently attached to the base condensation polymer layer. The crosslinked ethanolamine condensation polymer layer includes quaternary amines, ether groups, and hydroxy groups. At least a portion of the ether groups of the crosslinked ethanolamine condensation polymer layer are spaced from the quaternary amines by a second two carbon spacer. At least a portion of the hydroxy groups of the crosslinked ethanolamine condensation polymer layer are spaced from the quaternary amines by the first two carbon spacer. The glycidol condensation layer can be covalently attached to the crosslinked ethanolamine condensation polymer layer. The glycidol condensation layer includes a plurality of dihydroxy groups, in which each dihydroxy group includes a first hydroxy group and a second hydroxy group. The first hydroxy is spaced from the second hydroxy by the first two carbon spacer, in which at least a portion of the first hydroxy groups are spaced from the quaternary amines of the crosslinked ethanolamine condensation polymer layer by the first two carbon spacer.

In regards to the first embodiment, the first two carbon spacer includes a chemical formula of

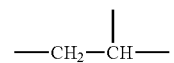

and the second two carbon spacer includes a chemical formula of —CH$_2$—CH$_2$—.

A second embodiment of an anion exchange stationary phase formed by a method including reacting a polyepoxide with a primary amine to form a base condensation polymer layer on a negatively charged substrate particle. The base condensation polymer layer can be reacted with a number of reaction cycles to form a crosslinked ethanolamine polymer layer, in which the number of reaction cycles ranges from about three to about ten. Each reaction cycle can include a polyepoxide treatment followed by an ethanolamine treatment. The crosslinked ethanolamine polymer layer can be reacted with a first glycidol treatment and then a second glycidol treatment. The anion exchange stationary phase is formed after the glycidol treatments of the crosslinked ethanolamine polymer layer.

In regards to the second embodiment, the anion exchange stationary phase can be formed by the method that further includes treating the crosslinked ethanolamine polymer layer with a hydroxide solution before each of the first glycidol treatment and the second glycidol treatment.

In regards to any of the second embodiments, the negatively charged substrate particles are contained in a first column. The reacting of the polyepoxide with the primary amine can include flowing a solution of the polyepoxide and the primary amine through the first column to form the base condensation polymer layer on the negatively charged substrate particles.

In regards to any of the second embodiments, the polyepoxide treatment can include flowing a solution of the polyepoxide through the first column and the ethanolamine treatment can include flowing a solution of the ethanolamine through the first column.

In regards to the any of the second embodiments, the first glycidol treatment and the second glycidol treatment can each include flowing a solution of the glycidol through the first column.

In regards to the any of the second embodiments, in which the method further includes, after the glycidol treatments, removing the packed bed of the anion exchange stationary phase from the first column into a container. The anion exchange stationary phase is treated with a hydroxide solution and then the hydroxide solution is removed. The hydroxide treated anion exchange stationary phase is packed into a second column in which a diameter of the second column is less than the first column.

In regards to the any of the second embodiments, the number of the reaction cycles ranges from about 3 to about 4.

In regards to any of the second embodiments, the polyepoxide can include a diepoxide compound. The polyepoxide can include an alkyldiol diglycidyl ether. The diepoxide compound can be 1,4-butanediol diglycidyl ether.

A third embodiment of an anion exchange stationary phase includes a negatively charged substrate particle, a base condensation polymer layer, a first polyepoxide condensation reaction product, a first ethanolamine condensation reaction product, a second polyepoxide condensation reaction product, a second ethanolamine condensation reaction product, a third polyepoxide condensation reaction product, a third ethanolamine condensation reaction product, a first glycidol condensation reaction product, and a second glycidol condensation reaction product.

In regards to any of the third embodiments, the anion exchange stationary phase may further include one or more of a fourth, fifth, sixth, seventh, eighth, ninth, and ten polyepoxide condensation reaction products.

In regards to any of the third embodiments, the anion exchange stationary phase may include one or more of a fourth, fifth, sixth, seventh, eighth, ninth, and ten ethanolamine condensation reaction products.

In regards to any of the third embodiments, the anion exchange stationary phase may include one or more of a third, fourth, fifth, sixth, seventh, eighth, ninth, and ten glycidol condensation reaction products.

In regards to any of the third embodiments, the base condensation polymer layer is attached to the negatively charged substrate particle. The base condensation polymer layer includes a reaction product of i) a primary amine and ii) a first polyepoxide compound. The first polyepoxide condensation reaction product can be covalently attached to the base condensation polymer layer. The first polyepoxide condensation reaction product includes a reaction product of i) an amine group of the base condensation polymer layer and ii) a second polyepoxide compound, in which the amine group of the base condensation polymer layer includes a positive charge so that the base condensation polymer layer is ionically coupled to the negatively charged substrate particle. The first ethanolamine condensation reaction product can be covalently attached to the first polyepoxide condensation reaction product. The first ethanolamine condensation reaction product includes a reaction product of i) an epoxide group of the first polyepoxide condensation reaction product, and ii) a first ethanolamine. The second polyepoxide condensation reaction product can be covalently attached to the first ethanolamine condensation reaction product. The second polyepoxide condensation reaction product includes a reaction product of i) an amine group of the first ethanolamine condensation reaction product and ii) a third polyepoxide compound. The second ethanolamine condensation reaction product can be covalently attached to the second polyepoxide condensation reaction product. The second ethanolamine condensation reaction product includes a reaction product of i) an epoxide group of the second polyepoxide condensation reaction product and ii) a second ethanolamine. The third polyepoxide condensation reaction product can be covalently attached to the second ethanolamine condensation reaction product. The third polyepoxide condensation reaction product includes a reaction product of i) an amine group of the second ethanolamine condensation reaction product and ii) a fourth polyepoxide compound. The third ethanolamine condensation reaction product can be covalently attached to the third polyepoxide condensation reaction product. The third ethanolamine condensation reaction product includes a reaction product of i) an epoxide group of the third polyepoxide condensation reaction product and ii) a third ethanolamine. The first glycidol condensation reaction product can be covalently attached to the third ethanolamine condensation product. The first glycidol condensation reaction product includes a reaction product of i) an amine of the third ethanolamine condensation reaction product and ii) a first glycidol. The second glycidol condensation polymer can be covalently attached to the first glycidol condensation product. The second glycidol condensation polymer includes a reaction product of i) a hydroxy group of the first glycidol condensation reaction product, in which a portion of the hydroxy groups of the first glycidol condensation reaction product is spaced from an amine of the third ethanolamine condensation reaction product by a two carbon spacer, and ii) a second glycidol.

In regards to any of the third embodiments, the second polyepoxide condensation reaction product may further include the reaction product of i) a hydroxy group of the first ethanolamine condensation reaction product, and ii) the third polyepoxide compound.

In regards to any of the third embodiments, one or more of the second, third, fourth, fifth, sixth, seventh, eighth, ninth, and ten polyepoxide condensation reaction products may further include the reaction product of i) a hydroxy group of one of the ethanolamine condensation reaction products and ii) another polyepoxide compound.

In regards to any of the third embodiments, the first polyepoxide compound, second polyepoxide compound, third polyepoxide compound, and the fourth polyepoxide compound are each a diepoxide compound. The diepoxide compound may include an alkyldiol diglycidyl ether. The diepoxide compound may include 1,4-butanediol diglycidyl ether.

A method of using an anion exchange stationary phases where the method includes flowing an eluent through a chromatography column, in which the eluent includes a hydroxide. The chromatography column contains the anion exchange stationary phases of any one of the first, second, and third embodiments.

In regards to the method, it can further include separating at least one analyte from a sample injected into the chromatography column.

In regards to any of the first, second, and third embodiments, the negatively charged substrate particle can include a crosslinked divinylbenzene and ethylvinyl benzene particle, in which at least a surface of the negatively charged substrate particle includes sulfonate groups.

In regards to any of the first, second, and third embodiments, the base condensation polymer layer is positively charged and ionically attached to the negatively charged substrate particle.

In regards to any of the first, second, and third embodiments, the primary amine can be include alkylamine. The alkylamine can include methylamine.

In an embodiment of a chromatography column, it can contain the anion exchange stationary phases of any one of the first, second, and third embodiments. The chromatography column includes a hollow cylindrical housing, an inlet port, an outlet port, two frits where each one is coupled to the inlet port and the outlet port. Two end fittings can be used to bind the two frits to the respective inlet and outlet ports.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

DETAILED DESCRIPTION OF EMBODIMENTS

Figure 1:
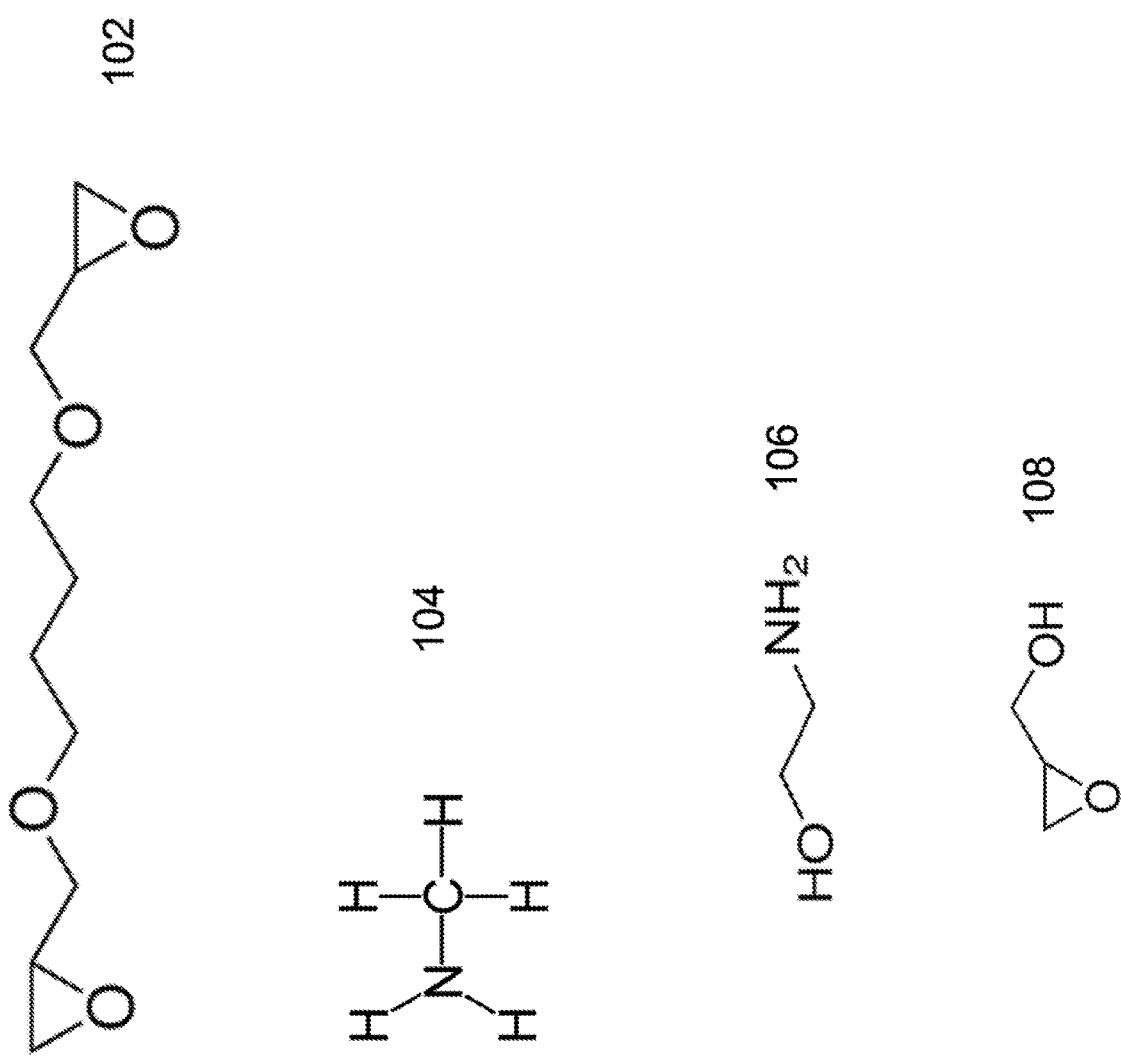
FIG. 1 illustrates various chemical structures of reagents that can be used in forming condensation polymers and condensation reaction products for anion exchange resins.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

Herein the term "alkyl," by itself or as part of another substituent, means, unless otherwise stated, a straight or branched chain, or cyclic hydrocarbon radical, or combination thereof, which may be fully saturated, mono- or poly-unsaturated and can include di- and multivalent radicals, having the number of carbon atoms designated (i.e., $C_1$-$C_{10}$ means one to ten carbons). Examples of saturated hydrocarbon radicals include, but are not limited to, groups such as methyl, ethyl, n-propyl (e.g., —$CH_2$—$CH_2$—$CH_3$, —$CH_2$—$CH_2$—$CH_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl". Alkyl groups that are limited to hydrocarbon groups are termed "homoalkyl". The term "alkyl" can also mean "alkylene" or "alkyldiyl" as well as alkylidene in those cases where the alkyl group is a divalent radical.

Herein the term "alkylene" or "alkyldiyl" by itself or as part of another substituent means a divalent radical derived from an alkyl group, as exemplified, but not limited, by —CH$_2$CH$_2$CH$_2$— (propylene or propane-1,3-diyl), and further includes those groups described below as "heteroalkylene". Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

Herein the term "alkylidene" by itself or as part of another substituent means a divalent radical derived from an alkyl group, as exemplified, but not limited, by CH$_3$CH$_2$CH$_2$= (propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

Herein the terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

Herein the term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NHCH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Optionally, for alkylene and heteroalkylene linking groups, no orientation of the linking group is implied by the direction in which the formula of the linking group is written. For example, the formula —CO$_2$R'— optionally represents both —C(O)OR' and —OC(O)R'.

Herein the terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

Herein the terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

Herein the term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, herein the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —OS(O)$_2$R', —S(O)$_2$NR'R", —NRSO2R', —CN and —NO$_2$ in a number ranging from zero to (2m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO2R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro (C$_1$-C$_4$)alkyl, in a number ranging from zero to the total number of open valences on the aromatic ring system; and where R', R", R"' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R"' and R"" groups when more than one of these groups is present.

In an embodiment, sulfonated resin particles can be coated with a reaction product of 1,4-butanediol diglycidyl ether and methylamine to form a base layer on the sulfonated resin particles by electrostatic interaction. Next, four reaction cycles of 1,4-butanediol diglycidyl ether and ethanolamine were sequentially added to form a crosslinked layer that was hydrophilic and provides divalent anion selectivity. The crosslinked layer may be referred to as a hyperbranched polymer. To further improve the separation of haloacetic acids and common inorganic anions, two glycidol treatments were used in modifying the hyperbranched polymer. The addition of glycidol in the hyperbranched architecture provided an added benefit to improve its ability to pack the resin into column tubes. Such glycidol containing hyperbranched architectures are unusually easy to pack with a simple hydroxide packing solution, providing unusually high chromatographic performance compared to similar materials not containing glycidol. Hyperbranched materials not containing glycidol tend to be highly dilatant, shear thickening slurries, which tend to produce fronting peak shape when packed at optimum flow rates. It is believed that glycidol rich phases exhibit less repulsive interactions due to the shielding of the charged groups, which reduces shear thickening behavior and makes them easier to pack into a chromatography column. The resulting stationary phase has many available hydroxy groups to produce crosslinking across and also to aid in maintaining the hydrophilicity of the resin. The hydrophilic highly crosslinked polymer provides good selectivity for haloacetic acid separation along with common anions.

Anion exchange stationary phases were synthesized with a crosslinked ethanolamine layer followed by a glycidol treatment that results in a chromatography resin capable of separating haloacetic acid and common inorganic anions in a relatively short single chromatographic run (e.g., less than 20 to 30 minutes). Not only are the chromatographic runs shorter with the anion exchange stationary phases described herein, but lower concentrations of eluent can be employed when performing the single chromatographic run. In general, lower eluent concentrations are desirable for reducing cost and chemical waste. Haloacetic acids are carboxylic acids in which a halogen atom takes the place of a hydrogen atom in acetic acid. Examples of haloacetic acids include monochloroacetic acid, dichloroacetic acid, trichloroacetic acid, bromoacetic acid, dibromoacetic acid, tribromoacetic acid, bromochloroacetic acid, bromodichloroacetic acid, and dibromochloroacetic acid. Common inorganic anions include bromate, bromide, chlorate, chloride, chlorite, fluoride, nitrate, nitrite, phosphate, sulfate, and, carbonate, which are often monitored in drinking water (e.g., EPA Method 300.0). It should be noted that anion exchange stationary phases may also be referred to interchangeably as anion exchange resins. The anions chlorite, bromate, and chlorate may also be referred to as oxyhalides.

In an embodiment, a series of condensation polymer layers and condensation reaction products can be formed on a substrate. A polymer formed in a polymerization reaction with an amine and a polyepoxide may be referred to as a condensation polymer, condensation polymer reaction product, epoxy resin, or epoxy amine resin. Similarly, a condensation reaction product can be a product from a condensation reaction between a polymer and a reagent (e.g., epoxide or amine based reagent chemical). A polyepoxide includes a compound having two or more epoxide functional groups such as a diepoxide. An example of a polyepoxide may be an alkyldiol diglycidyl ether. Other examples of polyepoxides include butadiene diepoxide, ethyleneglycol diglycidyl ether, butanediol diglycidyl ether (e.g., 1,4-butanediol diglycidyl ether), diethyleneglycol diglycidyl ether, hexanediol diglycidyl ether, glycerol triglycidyl ether and numerous other compounds containing two or more epoxy groups including epoxy resins commonly used in commercial epoxy formulations.

FIG. 1 illustrates various chemical structures of reagents that can be used in forming condensation polymers and condensation reaction products for anion exchange resins. The reagents illustrated in FIG. 1 are 1,4-butanediol diglycidyl ether 102, methylamine 104, ethanolamine 106, and glycidol 108.

Figure 2:
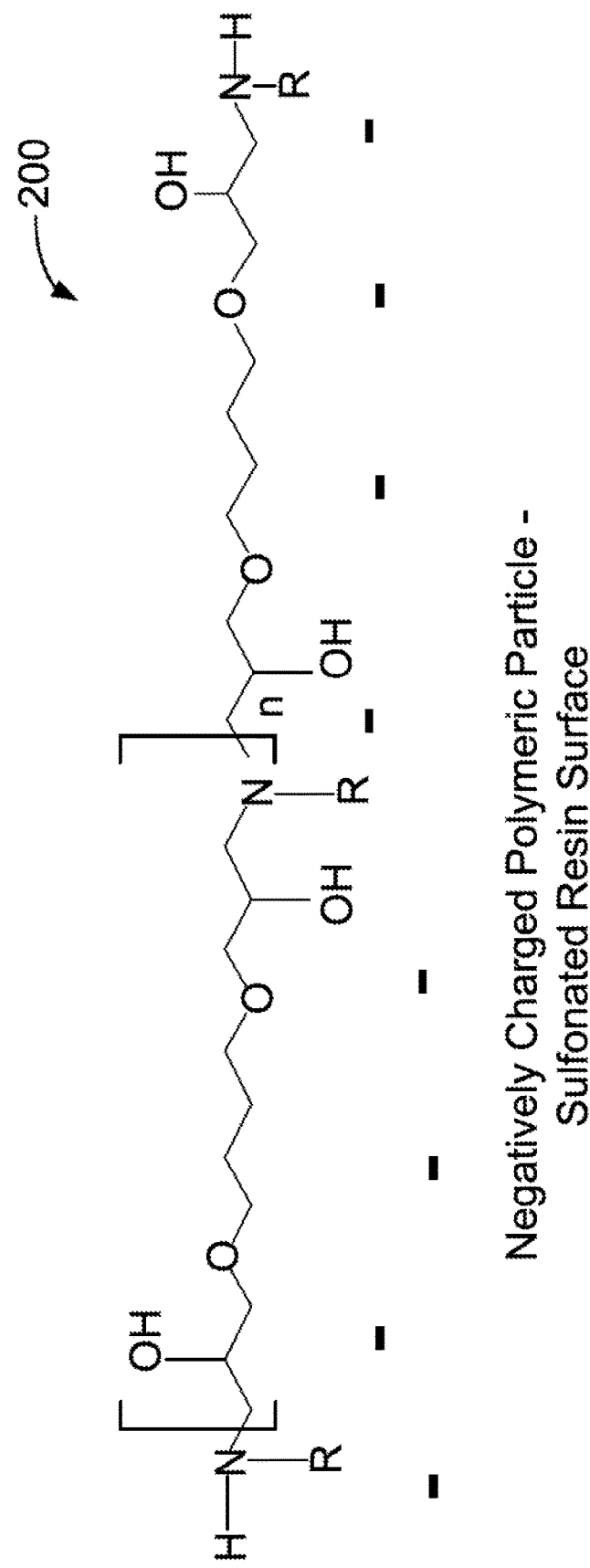
FIG. 2 illustrates a schematic representation of a base condensation polymer layer attached to a negatively charged substrate particle.

FIG. 2 illustrates a schematic representation of a base condensation polymer layer 200 attached to a negatively charged substrate particle. The base condensation polymer 200 can be formed by the reaction of a primary amine compound and an alkyldiol diglycidyl ether. The negatively charged substrate particle can be contained as a packed bed in a reaction column. A solution of the polyepoxide and the primary amine can be flowed through the reaction column to form the base condensation polymer layer on the negatively charged substrate particle. The base condensation polymer includes quaternary amines, ether groups, and hydroxy groups. An example of a primary amine and an alkyldiol diglycidyl ether respectively include a methyl amine 104 and 1,4-butanediol diglycidyl ether 102 (see FIG. 1). In an aspect, the mole ratio can be a 1:1 mole ratio of primary amine and alkyldiol diglycidyl ether to form the base polymer layer. Although the base polymer layer is depicted as linear, it is possible for some of the amine groups to be quaternized and form either a branched or crosslinked portions. The base layer 200 can be formed in the presence of a negatively charged polymeric particle where the base layer associates and/or partially binds with the negatively charged polymeric particle, as illustrated in FIG. 2. Referring to FIGS. 2-4, and 9, R may be an alkyl group such as, for example, methyl, ethyl, propyl, butyl, pentyl, or hexyl, but is preferably methyl. The term n may be value ranging from about 5 to 150.

The negatively charged polymeric particle can be any inert polymeric substrate particle that is chemically stable under the intended conditions of use (e.g., pH 0 to 14). The polymeric particle may be based on a divinylbenzene (DVB) crosslinking monomer and a support resin monomer where the support resin monomer may be an ethylvinylbenzene (EVB) monomer, a styrene monomer, and a combination thereof. The mole percent of DVB can be 55% and EVB can be 45%. The support resin particles may have a diameter ranging from about 1 micron to about 20 microns, preferably from about 2 microns to about 10 microns, and more preferably from about 3 microns to about 7 microns. The support resin particles may have a surface area ranging from about 20 m$^2$/g to about 800 m$^2$/g, preferably from about 20 m$^2$/g to about 500 m$^2$/g, more preferably from about 20 m$^2$/g to about 100 m$^2$/g, and yet more preferably be about 20 m$^2$/g to about 30 m$^2$/g. The support resin particles may have a pore size ranging from about 1000 angstroms to about 2000 angstroms.

In some embodiments, the negatively charged substrate particle may include one or more super macroporous particles (SMP). SMP can be obtained from commercial sources, including Agilent PLRP-s1000A and Waters Styragel HR4-HR6. The super macroporous particle can have a diameter of 4-6 μm, a surface area of 20-30 m$^2$/g, pore sizes of 1000 Å-2000 Å, and a crosslinking mole ratio of 55% of the divinylbenzene and a mole ratio of 45% of the ethylvinylbenzene.

Alternatively, the polymeric particles may be based on other vinylaromatic monomers such as alpha-methylstyrene, chlorostyrene, chloromethylstyrene, vinyltoluene, vinylnaphthalene, and a combination thereof. The polymeric particles may also be based on unsaturated monomers, and copolymers of the above vinylaromatic monomers and unsaturated monomers. Preferably such monomers will be copolymerized with a vinylaromatic crosslinking monomer such as divinylbenzene but other vinylaromatic crosslinking monomers such as trivinylbenzene, divinylnaphthalene, and a combination thereof may also be used.

The polymeric particles can be sulfonated to create a negative charge at least on the surface of the particle. For example, particles made with 45% DVB and 55% EVB can be sulfonated by treating the particles with glacial acetic acid and concentrated sulfuric acid.

Referring back to FIG. 2, base layer 200 can be reacted with at least three reactions cycles of reagents to form a crosslinked ethanolamine polymer layer. Each reaction cycle includes a) a polyepoxide treatment and b) a hydroxyalkylamine treatment. The polyepoxide treatment can include flowing a solution of the polyepoxide through the reaction column and the hydroxyalkylamine treatment can include flowing a solution of the ethanolamine through the reaction column.

Figure 3:
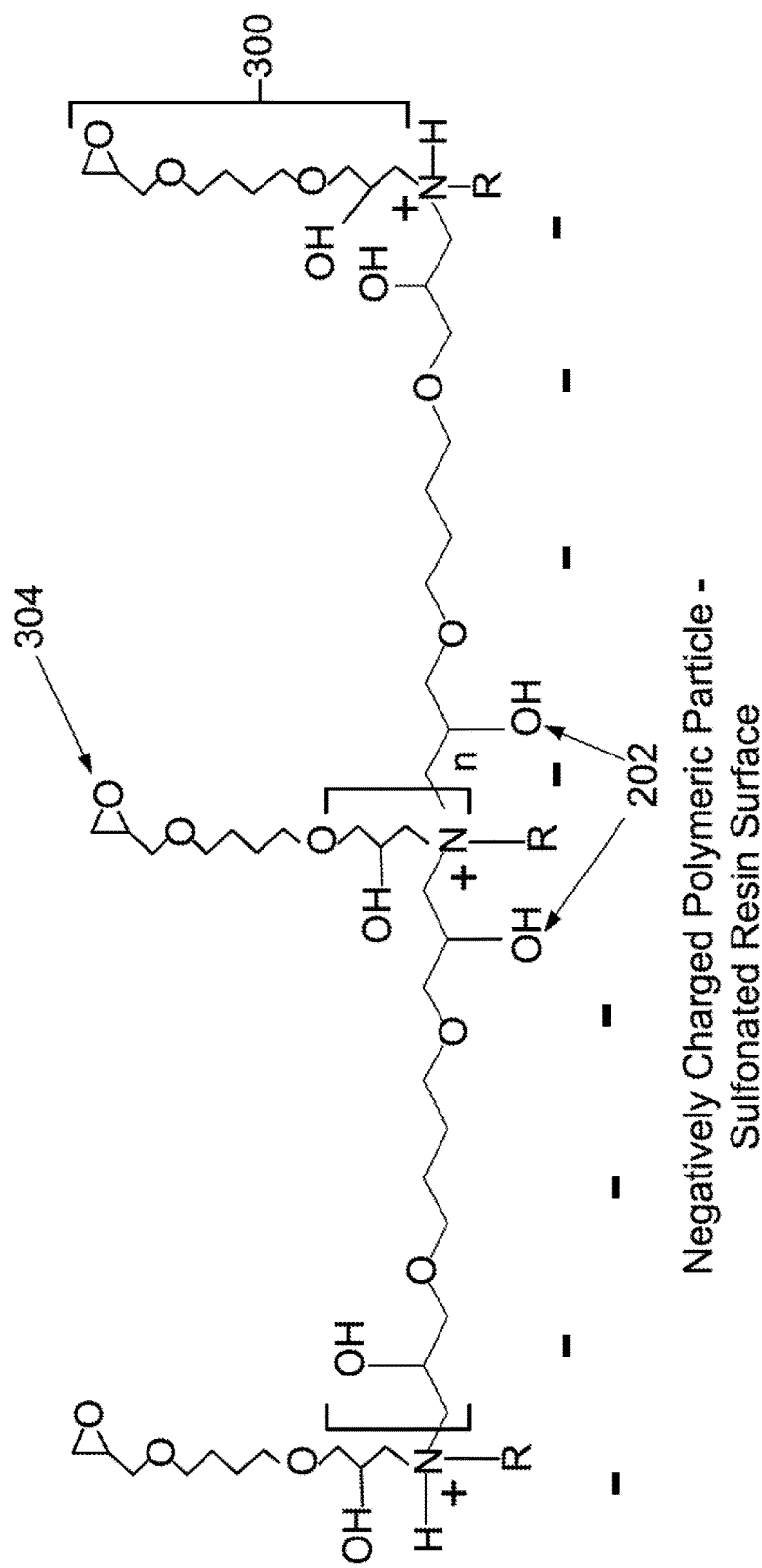
FIG. 3 illustrates a schematic of a first diepoxide covalently attached to the base condensation polymer and forming a pendant epoxide group to form a first diepoxide condensation reaction product.

For the first step a) of a first cycle, alkyldiol diglycidyl ether can be reacted with base layer 200 to form a first polyepoxide condensation reaction product (CRP) 300 having pendant epoxide groups 304, as illustrated in FIG. 3. In addition, the tertiary amines of base layer 200 are converted to quaternary amines that have a positive charge. It is worthwhile to note that such positive charges are believed to help base layer 200 to ionically bond to the negatively charged particles. After the quaternization of the amine of the base layer 200, at least a portion of the hydroxy groups 202 are spaced from the quaternary amine by a two carbon spacer. The first polyepoxide CRP 300 can be covalently attached to the base condensation polymer 200. The first polyepoxide CRP 300 includes a reaction product of i) an amine group of the base condensation polymer 200, and ii) a second polyepoxide compound, in which the amine group of the base condensation polymer includes a positive charge so that the base condensation polymer 200 is ionically coupled to the negatively charged substrate particle.

Figure 4:
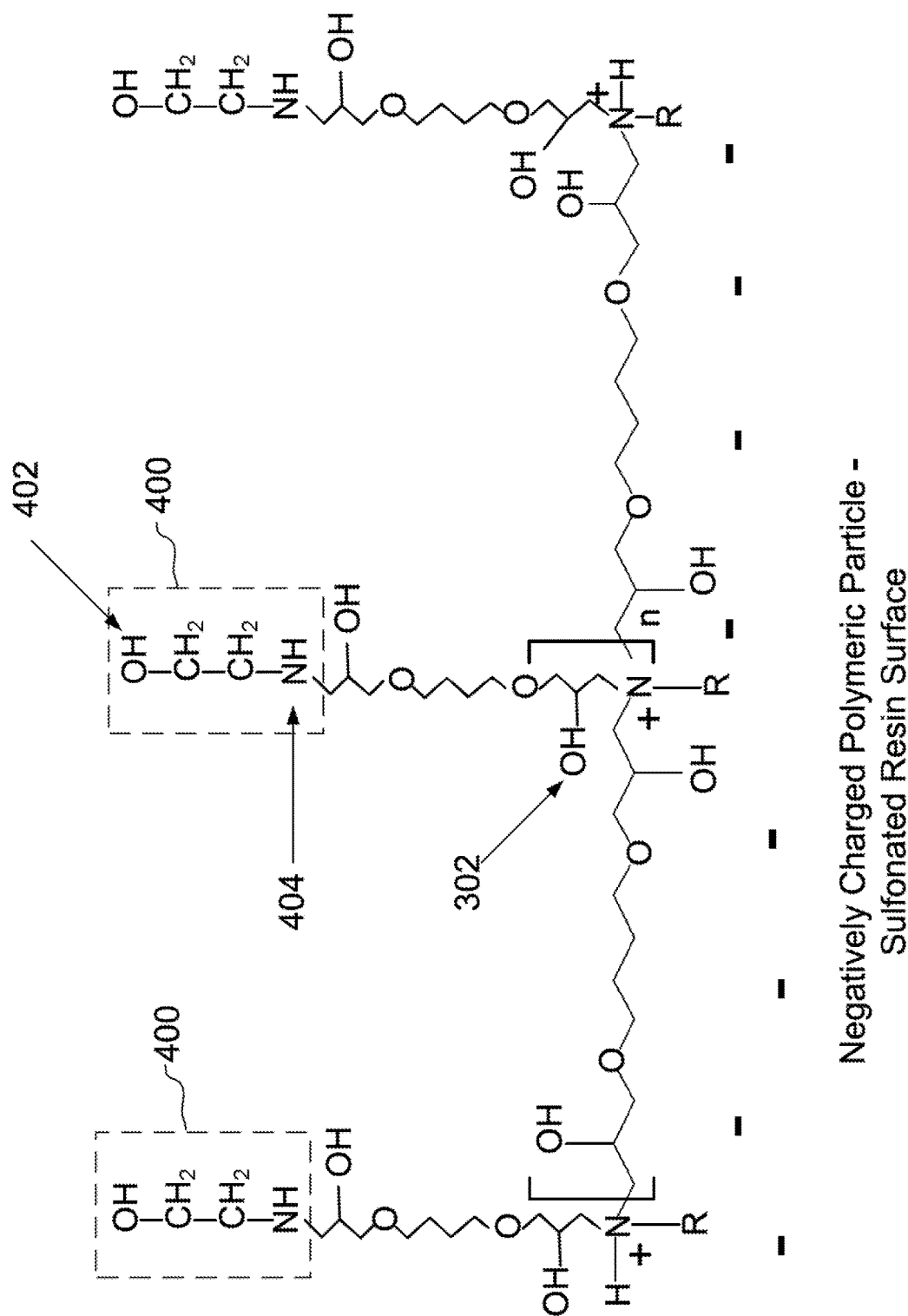
FIG. 4 illustrates a schematic of amine groups of a first ethanolamine reagent covalently attached to the pendant epoxide groups to form a first ethanolamine condensation reaction product.

For a second step b) of the first cycle, the pendant epoxide groups 304 can be reacted with a first ethanolamine to form a first ethanolamine CRP 400, as illustrated in FIG. 4. The first ethanolamine CRP 400 includes a secondary amine 404 and a pendant hydroxy compound 402, as illustrated in FIG. 4. The first ethanolamine CRP 400 can be covalently attached to the first polyepoxide CRP 300. The first ethanolamine CRP 400 includes a reaction product of i) an epoxide group 304 of the first polyepoxide CRP 300, and ii) a first ethanolamine.

Figure 5:
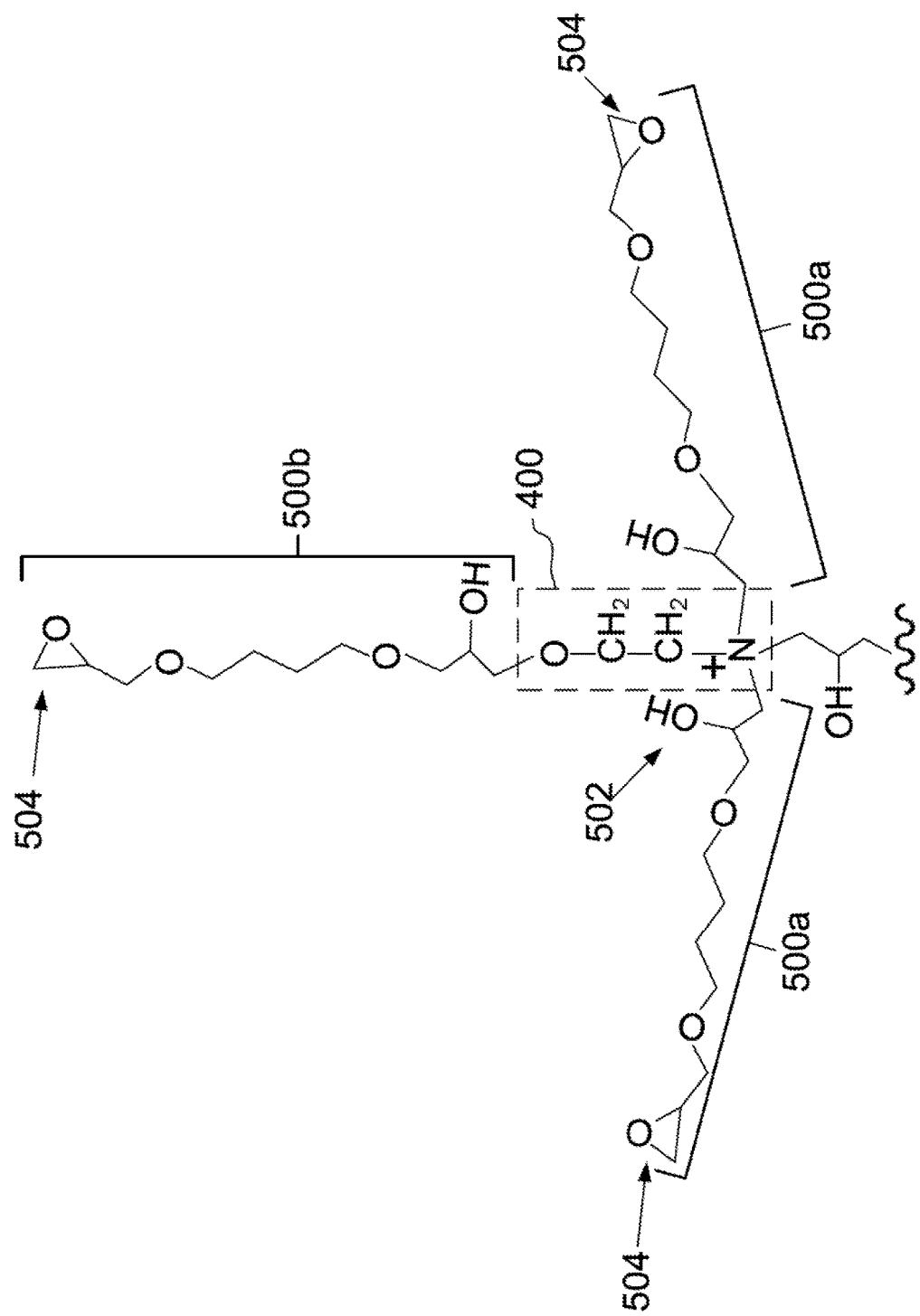
FIG. 5 illustrates a schematic of a second diepoxide covalently attached to a hydroxy group or amine group of the first ethanolamine condensation reaction product to form a second diepoxide condensation reaction product as three branches of pendant epoxide groups.

Now that one reaction cycle of two steps has been performed, a second cycle of two steps may be performed to create a hyperbranched structure. For a first step a) of a second cycle, the pendant hydroxy group 402 and the secondary amine compound 404 can be reacted with one alkyldiol diglycidyl ethers and two alkyldiol diglycidyl ethers, respectively, to form the second polyepoxide CRP (500b and 500a). The second polyepoxide CRP (500b and 500a) can be covalently attached to the first ethanolamine CRP 400. The second polyepoxide CRP (500b and 500a) includes a reaction product of i) an amine group 404 of the first ethanolamine CRP 400, and ii) a third polyepoxide compound. Under certain circumstances, the second polyepoxide CRP (500b and 500a) can further include a reaction product of i) a hydroxy group 402 of the first ethanolamine CRP 400, and ii) a third polyepoxide compound. As illustrated in FIG. 5, one pendant epoxide branch 500b can be formed from the pendant hydroxy group 402 and two pendant epoxide branches 500a can be formed from the secondary amine group 404. In addition, the secondary amine 404 is converted to a quaternary amine that has a positive charge. It should be noted that the reactivity of pendant hydroxy group 402 may be less than that of the secondary amine group 404 with the epoxy groups. Thus, the proportion of branch 500b may be less than branch 500a. Although FIG. 5 illustrates each diepoxide compound as only reacting with one of the two epoxide groups with first ethanolamine CRP 400, it is possible for a proportion of diepoxide compounds to crosslink by reacting both of two epoxide groups with the first ethanolamine CRP 400, or one epoxy group of the diepoxide with the first ethanolamine CRP 400 and the other epoxy group of the diepoxide with a different ethanolamine CRP 400.

Figure 6:
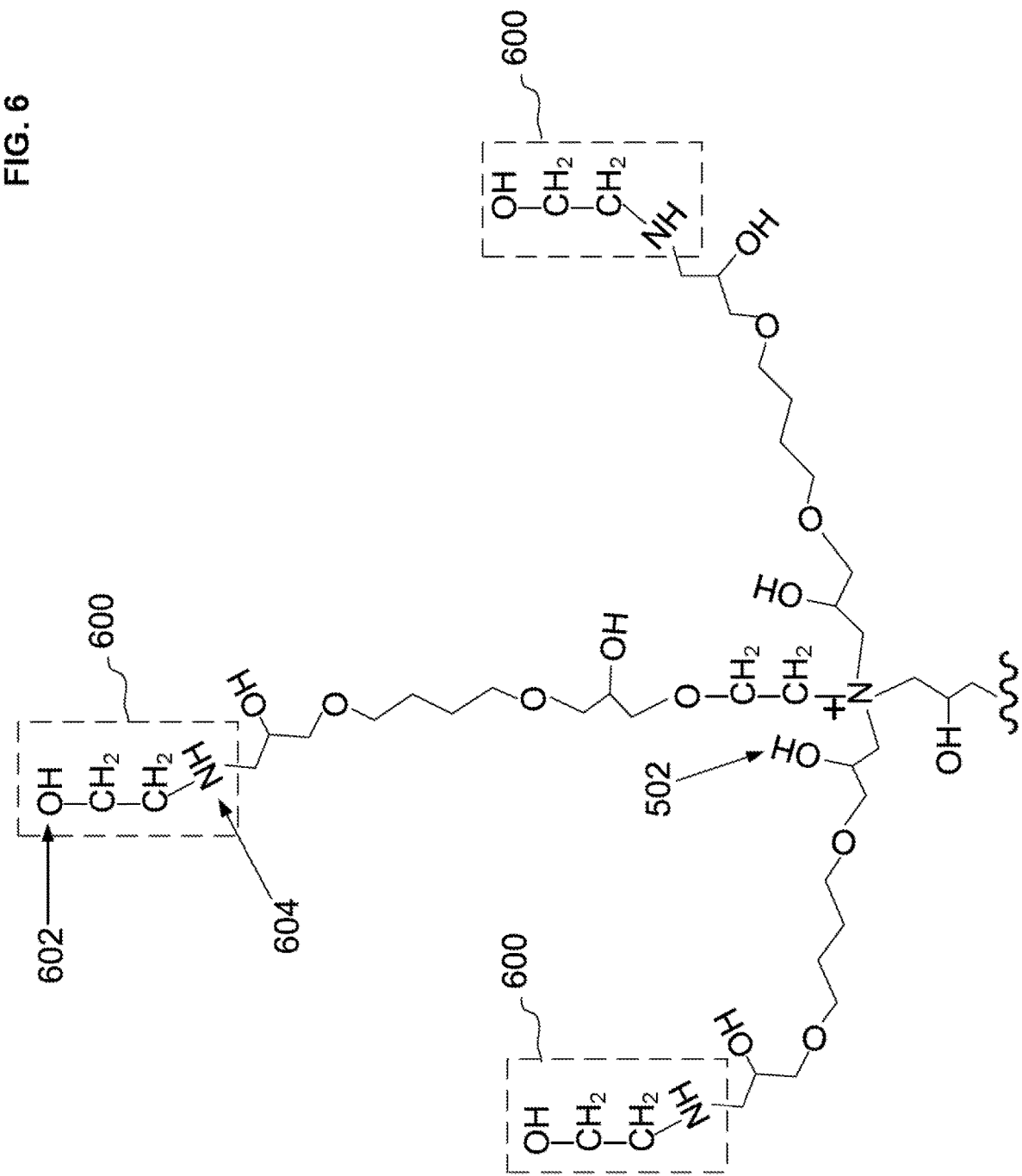
FIG. 6 illustrates a schematic of the second ethanolamine covalently attached to the pendant epoxide groups of the second diepoxide condensation reaction product to form a second ethanolamine condensation reaction product.

For a second step b) of the second cycle, the pendant epoxide groups 504 can then be reacted with a second ethanolamine to form a second ethanolamine CRP 600 that has a pendant hydroxy group 602 along with a secondary amine 604, as illustrated in FIG. 6. The second ethanolamine CRP 600 can be covalently attached to the second polyepoxide CRP (500a and 500b). The second ethanolamine CRP 600 includes a reaction product of i) an epoxide group 504 of the second polyepoxide CRP (500a and 500b), and ii) a second ethanolamine. Although FIG. 6 illustrates each ethanolamine compound as only reacting with one pendant epoxide group, it is possible for a proportion of the ethanolamine compounds to react with two different pendant epoxide groups causing a crosslink.

A third reaction cycle of two steps can be performed with the second ethanolamine CRP 600. For a first step a) of a third cycle, the pendant hydroxy group 602 and the secondary amine compound 604 can be reacted with one alkyldiol diglycidyl ethers and two alkyldiol diglycidyl ethers, respectively, to form the third polyepoxide CRP (not shown). The third polyepoxide CRP can be covalently attached to the second ethanolamine CRP 600. The third polyepoxide CRP includes a reaction product of i) an amine group of the second ethanolamine condensation reaction product, and ii) a fourth polyepoxide compound. It should be noted that the third polyepoxide CRP includes pendant epoxide groups and have a chemical structure analogous to the second polyepoxide CRP (500a and 500b of FIG. 5).

For a second step b) of the third cycle, the pendant epoxide groups of the third polyepoxide CRP can then be reacted with a third ethanolamine to form a third ethanolamine CRP (not shown). The third ethanolamine CRP can be covalently attached to the third polyepoxide condensation reaction product. The third ethanolamine CRP includes a reaction product of i) an epoxide group of the third polyepoxide condensation reaction product, and ii) a third ethanolamine. It should be noted that the third ethanolamine CRP would have a chemical structure analogous to the second ethanolamine CRP (600 of FIG. 6).

Similar to the third reaction cycle of two steps, a fourth reaction cycle can be performed with the third ethanolamine CRP. For a first step a) and a second step b) of the fourth cycle, the third ethanolamine CRP is reacted with alkyldiol diglycidyl ether and then a fourth ethanolamine to form a fourth polyepoxide CRP (not shown) and a fourth ethanolamine CRP (not shown). It should be noted that the fourth polyepoxide CRP and the ethanolamine CRP would have a chemical structure analogous to the second polyepoxide CRP (500a and 500b of FIG. 5) and the second ethanolamine CRP (600 of FIG. 6), respectively.

In an embodiment, an anion exchange stationary phase includes a base layer 200 that is reacted with at least about three to about ten reactions cycles of reagents (diepoxide and ethanolamine), and preferably about three to about four reactions cycles of reagents to form a crosslinked ethanolamine polymer layer. The crosslinked ethanolamine condensation polymer layer can be covalently attached to the base condensation polymer. The crosslinked ethanolamine condensation polymer layer includes quaternary amines, ether groups, and hydroxy groups, as illustrated in FIGS. 3 to 6. At least a portion of the ether groups are spaced from the quaternary amines by a two carbon spacer. Similarly, at least a portion of the hydroxy groups are spaced from the quaternary amines by the first two carbon spacer.

Now that the crosslinked ethanolamine polymer layer has been formed, it can be reacted with a first glycidol and a second glycidol treatment to form the anion exchange stationary phase. In an embodiment, the first and second glycidol treatments can each include flowing a solution of the glycidol through the reaction column.

Figure 7:
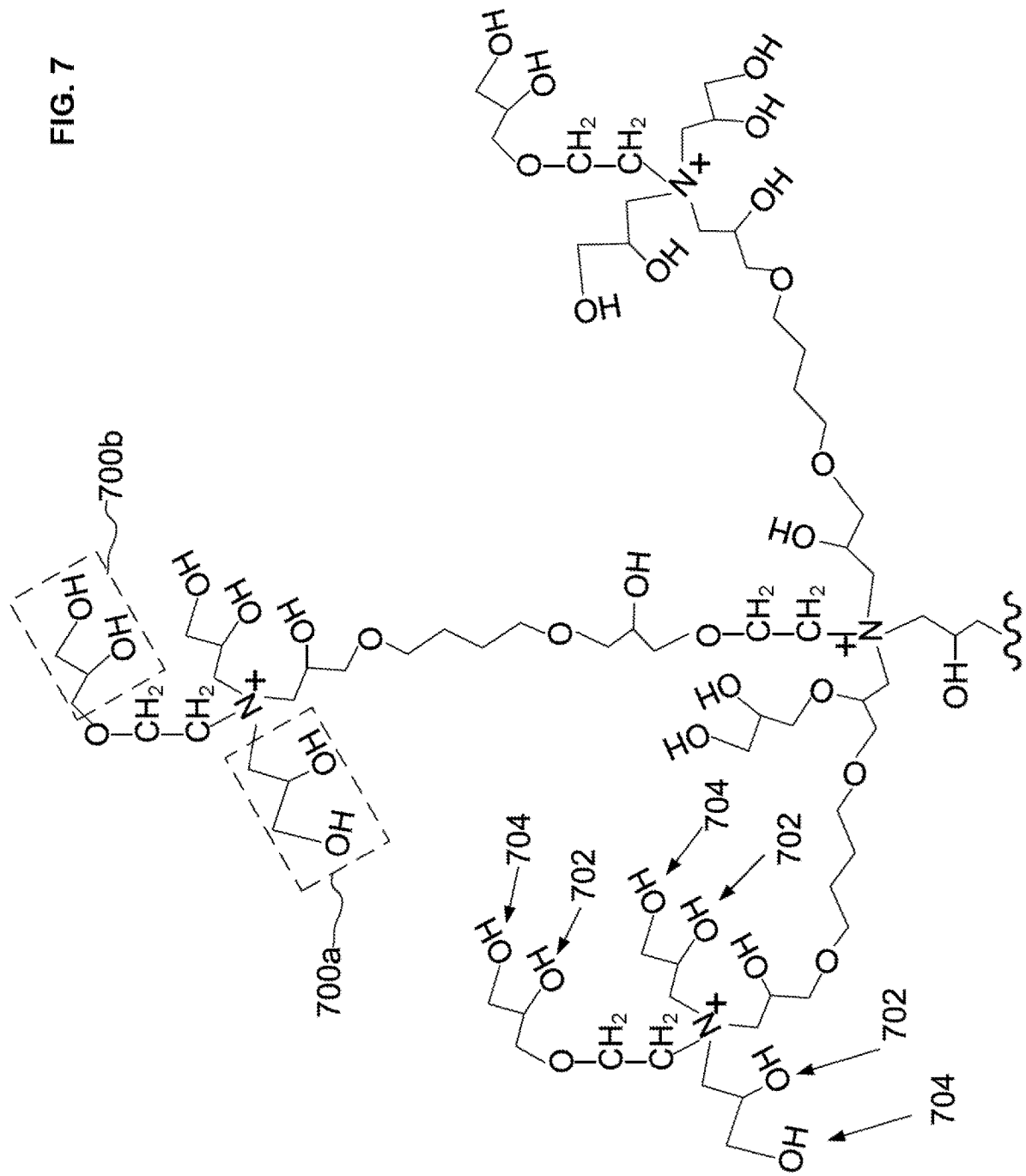
FIG. 7 illustrates a schematic of a first glycidol covalently attached to the second ethanolamine condensation reaction product where the amine group or the pendant hydroxy group of the second ethanolamine condensation reaction product has reacted with an epoxy group of the glycidol to form a first glycidol condensation reaction product that includes a branch of pendant dihydroxy groups.

A pendant hydroxy group (e.g., 602) and/or the secondary amine group (e.g., 604) of an ethanolamine CRP (e.g., 600 of FIG. 6) can be reacted with an epoxide portion of a first glycidol to form a first glycidol CRP (700b and 700a), as illustrated in FIG. 7. The first glycidol CRP (700b and 700a) can be covalently attached to the third ethanolamine condensation product. The first glycidol CRP (700b and 700a) includes a reaction product of i) an amine of the third ethanolamine CRP, and ii) a first glycidol. One pendant dihydroxy group branch 700b can be formed from the pendant hydroxy group (e.g., 602) and two pendant dihydroxy group branches 700a can be formed from the secondary amine group (e.g., 604). In addition, the secondary amine (e.g., 604) is converted to a quaternary amine that has a positive charge. It should be noted that hydroxy groups (e.g, 502) that are spaced apart from a quaternary amine with a two carbon spacer can be referred to as a beta hydroxy group. As illustrated in FIG. 7, beta hydroxy groups (e.g., 502) can be reactive with epoxy groups of glycidol to form additional dihydroxy group branches.

Figure 8:
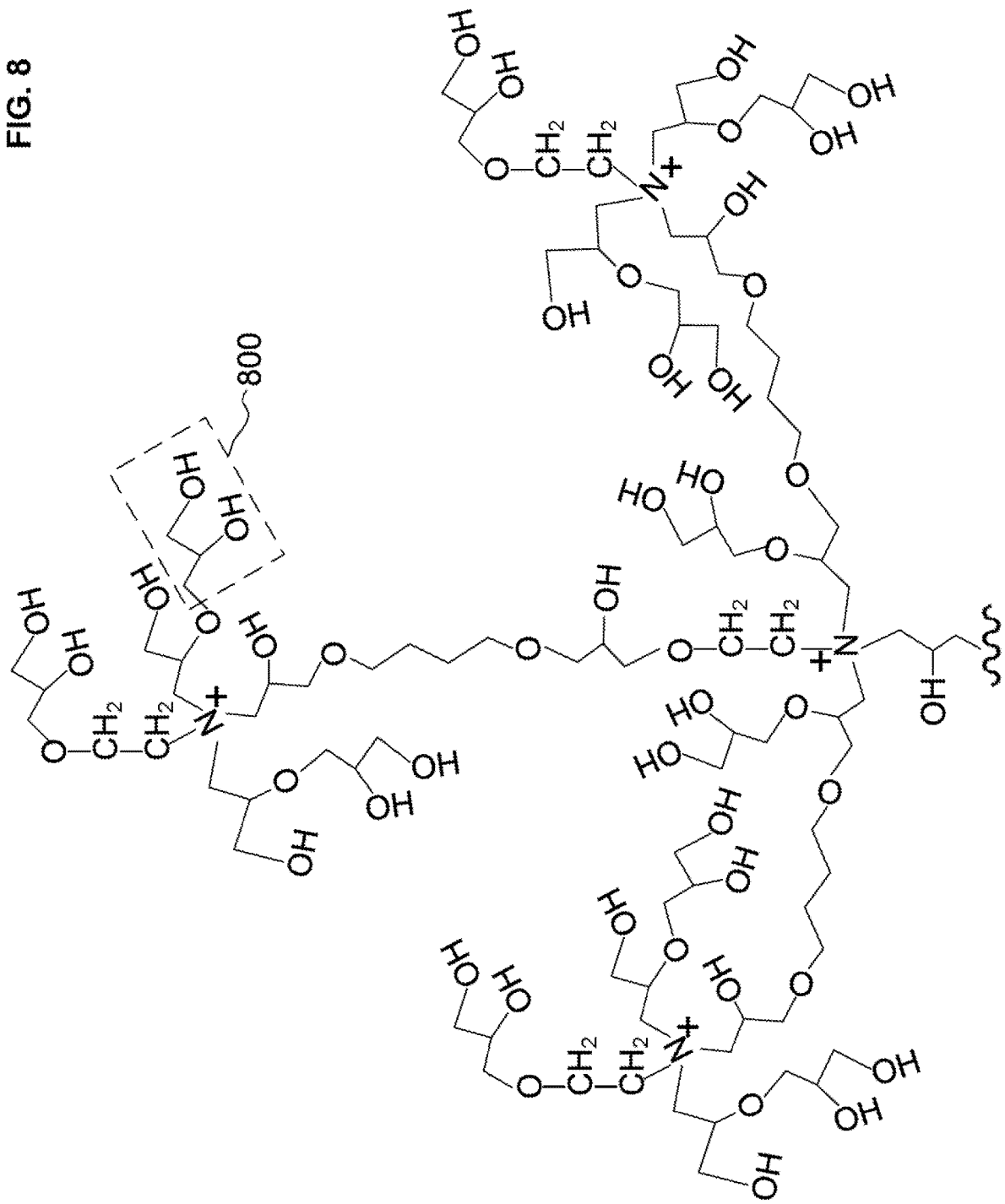
FIG. 8 illustrates a schematic of a second glycidol product covalently attached to the hydroxy group of the first glycidol condensation reaction product to form a second glycidol condensation reaction product.

To generate even more dihydroxy groups in the anion exchange resin, a second glycidol treatment can be used. FIG. 8 illustrates beta hydroxy groups 702 being reacted with a second glycidol to form a second glycidol CRP 800. The second glycidol CRP 800 can be covalently attached to the first glycidol CRP (700a and 700b). The second glycidol CRP 800 includes a reaction product of i) a hydroxy group (702 or 704) of the first glycidol CRP, in which a portion of the hydroxy groups 702 of the first glycidol CRP is spaced from a quaternary amine of the third ethanolamine condensation reaction product by a two carbon spacer; and ii) a second glycidol. It should be noted that the crosslinked ethanolamine polymer can be treated with a hydroxide solution before each of the first and second glycidol treatments. Such hydroxide solution treatments can deprotonate the beta hydroxy groups to enhance the reactivity with glycidol. It should be noted that the squiggle in FIGS. 5 to 8 can represent adjacent chemical moieties such as, for example, the base condensation polymer 200 and the first polyepoxide CRP 300.

In an embodiment, the crosslinked ethanolamine polymer layer can be reacted with two to ten, and preferably two to four sequential glycidol treatments to form a glycidol condensation layer that is covalently attached to the crosslinked ethanolamine condensation polymer layer. The glycidol condensation layer includes a plurality of dihydroxy groups, in which each dihydroxy group includes a first hydroxy group 702 and a second hydroxy group 704. The first hydroxy 702 is spaced from the second hydroxy 704 by the first two carbon spacer. At least a portion of the first hydroxy groups 702 is spaced from the quaternary amines of the crosslinked ethanolamine condensation polymer layer by the first two carbon spacer.

Figure 9:
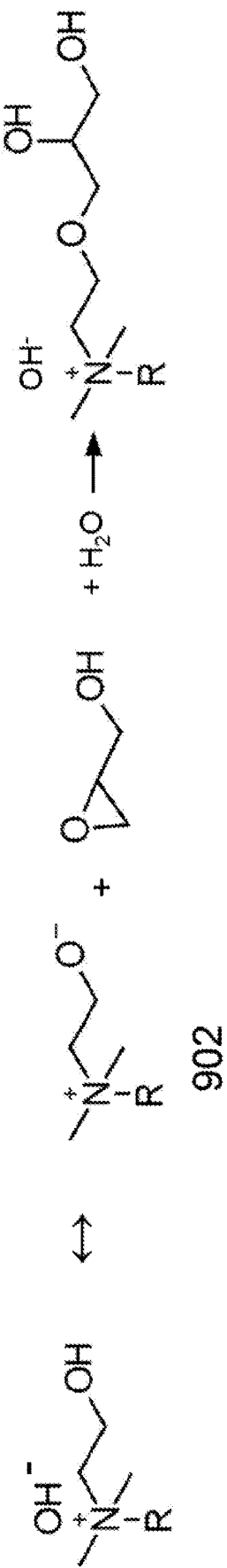
FIG. 9 illustrates an equilibrium of a hydroxy group that is spaced from a quaternary amine by a two carbon spacer where the hydroxy group is neutral or negatively charged. The deprotonated hydroxy group is shown as reacting with the epoxy group of the glycidol.

In an embodiment, the hydroxyalkylamine can be in the form of ethanolamine 106 having a two carbon spacer (e.g., alkyl) with a terminal hydroxy group and terminal amine group. It should be noted that the hydroxy groups 202 and 302 (see FIGS. 3 and 4) are both spaced apart from a quaternary amine by a two carbon spacer, which makes the hydroxy groups 202 and 302 more acidic. Hydroxy groups separated from the quaternary amine anion exchange site by a two carbon spacer (may be referred to as a beta position or a beta hydroxy group) are more acidic than hydroxy groups spaced apart by a three carbon spacer (gamma position), a four carbon spacer (delta position), or farther relative to the quaternary amine anion exchange site. The pKa of a beta hydroxy group is believed to be about 13.9, which makes it about 100 times more acidic than a hydroxy group not close to a quaternary amine group. As an example, a model compound choline can be used to illustrate the increased acidity of a beta hydroxy group with respect to a quaternary amine. The hydroxy group of choline has a pKa of 13.9, which is much lower than ethanol, which does not have a proximate quaternary amine. The hydroxy group of ethanol has a pKa of 15.9. As illustrated in FIG. 9, the deprotonated and negatively charged beta hydroxy group is stabilized by the proximate positive charge of the quaternary amine group, and thus, results in an increased acidity. The deprotonated hydroxy group can act as a stronger reactant for opening the epoxide ring of a glycidol group.

It is worthwhile to note that the glycidol treatments reduces the population of beta hydroxide groups in the ion exchange resin, and thus, alters the anion binding characteristics of the anion exchange resin. During an anion chromatographic separation, a hydroxide eluent is typically used. When the pH of the hydroxide eluent is sufficiently high, the beta hydroxide can be deprotonated causing the ion exchange site to form a zwitterionic ion pair 902 (see e.g., FIG. 9), which decreases the anion binding of the resin. Zwitterionic ion pair 902 has a positively charged quaternary amine that is stabilized by the negatively charged and deprotonated hydroxy group. The proximity of the positively charged quaternary amine and the deprotonated hydroxy group form a relatively stable zwitterionic pair that reduces the anion binding strength of the quaternary amine. Thus, the anion binding capability of anion exchange resins can be tuned based on the concentration (or pH) of the hydroxide eluent.

Example 1—Synthesis of the Anion Exchange Resin with Crosslinked Ethanolamine

A 9×250 mm (diameter×length) reaction column was packed with 6.5 μm diameter particles with surface sulfonated (one hour at room temperature) 20.8 m$^2$/g wide-pore resin (DVB/EVB). The base condensation layer was applied to a packed column by flowing a butanediol diglycidyl ether-methylamine solution mixture (10% (wt/wt %) with respect to butanediol diglycidyl ether: 4% (wt/wt %) with respect to methylamine) at 0.5 mL/minute through the column at 68° C. for 60 minutes to form a base condensation polymer 200 (see FIG. 2). Unless otherwise specified, the reagent solutions are prepared in deionized water. Next, 4 cycles of reagent treatment were flowed at 0.5 mL/minute through the column at 68° C. A single cycle of reagent treatment included a first step a) 10% (wt/wt %) butanediol diglycidyl ether solution was flowed through the column for 30 minutes to form a first diepoxide condensation reaction product 300 (see FIG. 3), a second step b) deionized water was flowed the column for 10 minutes, a third step c) 7.88% (wt/wt %) ethanolamine solution was flowed through column for 30 minutes to form a first ethanolamine condensation reaction product 400 (see FIG. 4), and a fourth step d) deionized water was flowed the column for 10 minutes. After completing the first cycle of reagent treatment (steps a) to d)), three additional cycles of reagent treatment were performed.

Example 2—Glycidol Treatment of the Anion Exchange Resin with Crosslinked Ethanolamine in the Chromatography Column The anion exchange resin with crosslinked ethanolamine was removed from the reaction column into a container. 400 grams of 1 M NaOH was mixed with 20 grams of the anion exchange resin (1:20 ratio of resin to 1M NaOH, wt/wt %) in the container. The mixture was then sonicated to disperse the resin particles at room temperature for 60 minutes and then sieved and filtered. Next, the filter cake was washed with deionized water. The resulting filter cake formed a cleaned-up resin that was packed into 2×250 mm chromatography columns.

The following solutions were flowed into the 2×250 mm packed chromatography columns at 0.1 mL/min. In step 1), deionized water was flowed for 5 minutes at 68° C. In step 2), 20% glycidol solution was flowed for 60 minutes at 68° C. to form the first glycidol condensation reaction product (e.g., 700a and 700b of FIG. 7). In step 3), deionized water was flowed for 5 minutes at 68° C. In step 4), 0.1 M NaOH was flowed at room temperature for 25 minutes. In step 5), deionized water was flowed for 5 minutes at 68° C. In step 6), 20% glycidol solution was flowed for 60 minutes at 68° C. to form the second glycidol condensation reaction product (see 800 of FIG. 8). In step 8), deionized water was flowed for 5 minutes at 68° C.

Example 3—Glycidol Treatment of the Anion Exchange Resin with Crosslinked Ethanolamine in the Reaction Column The following solutions were flowed solution at 0.5 mL/minute into the 9×250 mm reaction column of Example 1 containing anion exchange resin with crosslinked ethanolamine. In step 1), 0.1 M NaOH was flowed at room temperature for 30 minutes. In step 2), deionized water was flowed for 10 minutes at 68° C. In step 3), 20% glycidol solution was flowed for 60 minutes at 68° C. to form the first glycidol condensation reaction product (e.g., 700a and 700b of FIG. 7). In step 4), deionized water was flowed for 10 minutes at 68° C. In step 5), 0.1 M NaOH was flowed at 68° C. for 20 minutes. In step 6), deionized water was flowed for 10 minutes at 68° C. In step 7), 20% glycidol solution was flowed for 60 minutes at 68° C. to form the second glycidol condensation reaction product (see 800 of FIG. 8). In step 8), deionized water was flowed for 10 minutes at 68° C. In step 9), the anion exchange resin from the reaction column was removed into a container. In step 10), 400 grams of 1 M NaOH was mixed with 20 grams of the anion exchange resin (1:20 ratio of resin to 1M NaOH, wt/wt %) in the container, sonicated to disperse the resin particles at room temperature for 60 minutes, and then sieved and filtered. In step 11), the filter cake was washed with deionized water. The resulting filter cake formed a cleaned-up resin that was packed into 2×250 mm chromatography columns.

Example 4—Chromatogram of Standard Solution Containing Various Haloacetic Acids and Common Inorganic A chromatography column of was installed into a Thermo Scientific Dionex ICS-5000$^+$ ion chromatography system (commercially available from Thermo Fisher Scientific, Sunnyvale, Calif.). Three commercially available chromatography columns were used in the ion chromatography system (Thermo Scientific™ Dionex™ IonPac™ AS24, AS24A, and AS26). IonPac AS24, AS24A, and AS26 are anion exchange stationary phases that each includes a hyperbranched anion-exchange condensation polymer, electrostatically attached to the surface of a sulfonated wide-pore polymeric substrate. IonPac AS26 has alkanol quaternary ammonium functional groups and includes alternating treatments of epoxy monomer and methylamine to produce a coating that grows directly off of the substrate surface. In addition, the chromatography column of Examples 3 was also used. A pump was used to pump deionized water into a Thermo Scientific Dionex EGC 500 KOH cartridge (Thermo Fisher Scientific, Sunnyvale, Calif.) for generating a KOH gradient, which was different for each column type. The KOH gradient was optimized for each column to separate sulfate and phosphate from neighboring peaks. A temperature regulator was used to maintain a column temperature of 15° C. A Dionex AERS 500 suppressor was used along with a Thermo Scientific conductivity detector. Table 1 lists the relevant chromatographic system conditions for each type of chromatography column tested such as flow rate, injection volume, the gradient elution parameters, the suppressor format (for corresponding tubing diameter of the system), and applied current to the suppressor.

TABLE 1

| Column Type | Flow Rate (mL/min) | Injection Volume (μL) | Time (minutes) | KOH Concentration (mM) | AERS Format (mm)/Current (mA) |
|---|---|---|---|---|---|
| IonPac AS24 | 0.25 | 2.5 | 0-7 | 5 | 2/56 |
| | | | 7-16 | 5-25 | |
| | | | 16-27 | 25-90 | |
| | | | 27-45 | 90 | |
| IonPac AS24A | 0.25 | 2.5 | 0-7 | 5 | 2/45 |
| | | | 7-15 | 5-35 | |
| | | | 15-30 | 35-45 | |
| | | | 30-50 | 45 | |
| IonPac AS26 | 1.0 | 10 | 0-7 | 5 | 4/223 |
| | | | 7-16 | 5-35 | |
| | | | 16-25 | 35-90 | |
| | | | 25-60 | 90 | |
| Example 3 | 0.25 | 2.5 | 0-7 | 5 | 2/35 |
| | | | 7-16 | 5-25 | |
| | | | 16-23 | 25-55 | |
| | | | 23-40 | 55 | |

The chromatograms were run using a standard solution that contains the anions listed in Table 2 below.

TABLE 2

| Peak No. | Anion | mg/L |
|---|---|---|
| 1 | Fluoride | 2.0 |
| 2 | Monochloroacetate | 10.0 |
| 3 | Chlorite | 10.0 |
| 4 | Monobromoacetate | 10.0 |
| 5 | Bromate | 20.0 |

TABLE 2-continued

| Peak No. | Anion | mg/L |
|---|---|---|
| 6 | Chloride | 5.0 |
| 7 | Dichloroacetate | 30.0 |
| 8 | Sulfate | 20.0 |
| 9 | Dibromoacetate | 30.0 |
| 10 | Nitrite | 15.0 |
| 11 | Phosphate | 30.0 |
| 12 | Chlorate | 20.0 |
| 13 | Bromide | 20.0 |
| 14 | Trichloroacetate | 30.0 |
| 15 | Nitrate | 20.0 |
| 16 | Tribromoacetate | 30.0 |

Figure 10:
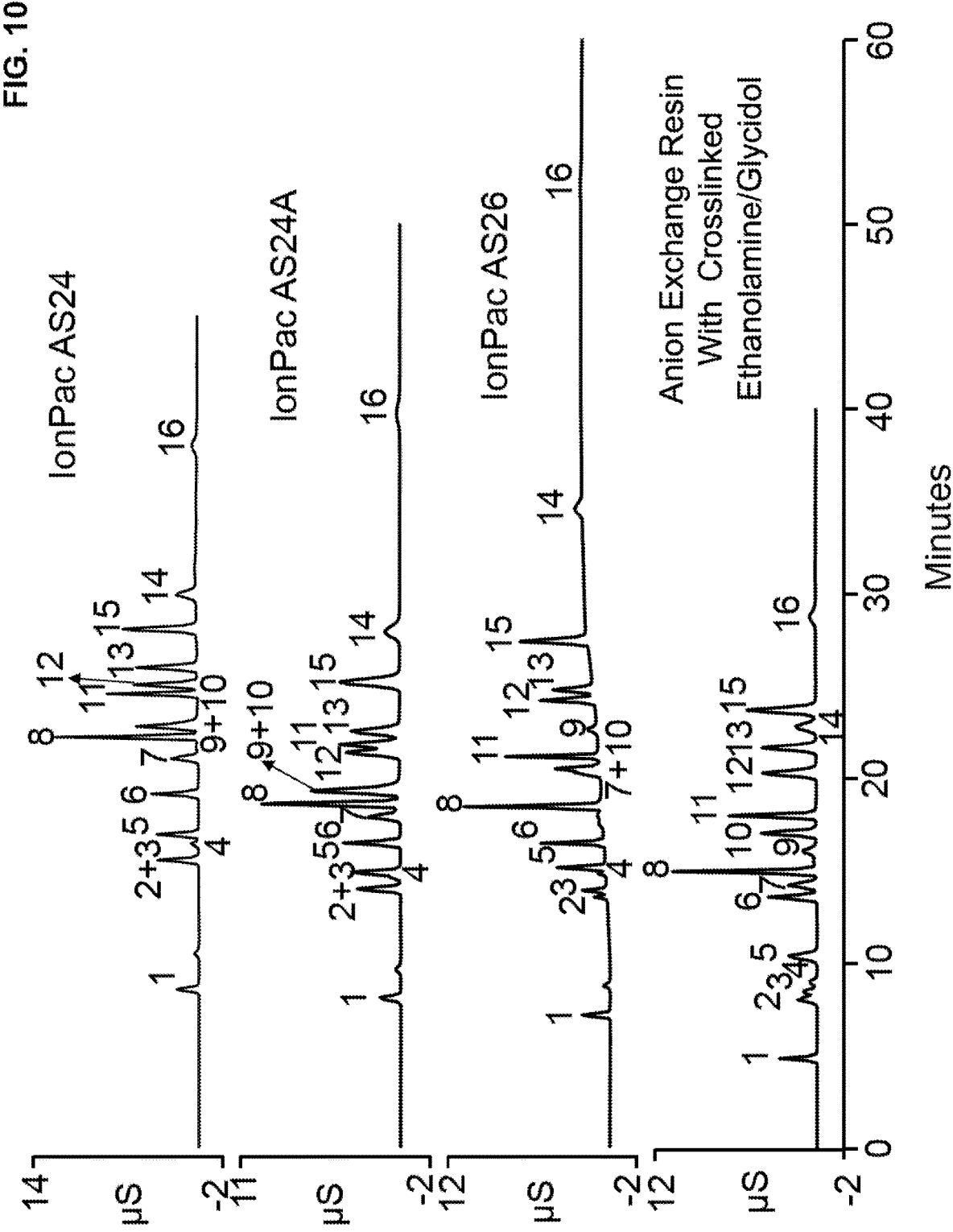
FIG. 10 illustrates four chromatograms that separated a standard solution containing various haloacetic acids and common inorganic anions using four different anion exchange resins, which are Thermo Scientific™ IonPac™ chromatography columns AS24, AS24A, AS26, and an anion exchange resin that includes crosslinked ethanolamine with glycidol treatments with substrate particles having a diameter of about 6.5 microns.

FIG. 10 illustrates four chromatograms of the standard solution using four different anion exchange resins, which are Thermo Scientific Dionex IonPac chromatography columns AS24, AS24A, AS26, and the column of Example 3 (in order from top to bottom). The chromatogram with the column containing crosslinked ethanolamine with glycidol treatments illustrated a shorter chromatographic run time (under 30 minutes) while partially resolving monochloroacetate and chlorite (peaks 2 and 3), and resolving dibromoacetate and nitrite (peaks 9 and 10). In contrast, the chromatograms run with IonPac AS24, AS24A, or AS26 required about 10 minutes or more run time to elute tribromoacetate (peak 16), and the three commercial columns failed to provide at least partial resolution for all of the haloacetic acids from important inorganic anions (e.g., nitrite—peak 10). In addition, the chromatograms run with IonPac AS24 and AS26 required higher eluent concentration than the column of Example 3.

Example 5—Chromatograms of the Standard Solution Containing Various Common Inorganic Anions Comparing Glycidol Treatment in Chromatography Column (Example 2) to Glycidol Treatment in Reaction Column (Example 3)

An ion chromatography system similar to Example 4 was employed with isocratic elution using a KOH eluent and a standard solution of common inorganic anions. The standard solution contained nine anions, which were fluoride 2.0 mg/L, chlorite 10.0 mg/L, bromate 20.0 mg/L, chloride 5.0 mg/L, sulfate 20.0 mg/L, nitrite 15.0 mg/L, chlorate 20.0 mg/L, bromide 20.0 mg/L, and nitrate 20.0 mg/L. A first chromatogram was performed using the column of Example 2 with 9 mM KOH eluent at 0.25 mL/min. A second chromatogram was performed using the column of Example 3 with 9 mM KOH eluent at 0.25 mL/min. Due to the co-eluting peaks of sulfate and nitrite, a third chromatogram was performed using the column of Example 3 with a higher 12 mM KOH eluent at 0.25 mL/min to separate sulfate and nitrite, so number of plates and asymmetry for sulfate can be measured accurately. The data from the first, second, and third chromatogram were shown in Table 3 below.

TABLE 3

| Column | Retention Time (minute) Nitrate | Plates (EP) Bromide | Asymmetry (AIA) Bromide | Plates (EP) Sulfate | Asymmetry (AIA) Sulfate | Column Pressure (PSI) | KOH Eluent Concentration (mM) | Flow Rate (mL/min) | Comments |
|---|---|---|---|---|---|---|---|---|---|
| First Chromatogram with Column of Example 2 | 37.13 | 4334 | 1.4 | 3259 | 1.27 | 2170 | 9 | 0.25 | Glycidol Treatment In Chromatography Column |
| Second Chromatogram with Column of Example 3 | 35.75 | 6439 | 1.14 | n/a | n/a | 2212 | 9 | 0.25 | Glycidol Treatment In Reaction Column |
| Third Chromatogram with Column of Example 3 | 20.02 | 6859 | 1.1 | 5769 | 0.99 | 2197 | 12 | 0.25 | Glycidol Treatment In Reaction Column |

The second chromatogram showed an improvement in the number of plates and asymmetry for bromide compared to the first chromatogram (from 4334 to 6439 plates, and from 1.4 to 1.14). The third chromatogram showed an improvement in the number of plates and asymmetry for sulfate compared to the first chromatogram (from 3259 to 5769 plates, and from 1.27 to 0.99). This chromatography column of Example 3 demonstrates that adding glycidol to the reaction column improves the subsequent packing of the chromatography columns, and results in a higher plate count and lower asymmetry compared to removing the ion exchange resin from the reaction column and then packing the chromatography column that is subsequently reacted with glycidol, as described in Example 2.

Example 6—Chromatograms Using Anion Exchange Resins with Smaller Particles

Anion exchange resins were synthesized in manner similar to Example 1 except that three different types of particles were used in the synthesis to create three different resins, which were referred to as A (4.75 micron diameter, 26.3 $m^2/g$, 4 hour at 80° C. sulfonation), B (4.55 micron diameter, 27.6 $m^2/g$, 4 hour at 80° C. sulfonation), and C (4.6 micron diameter, 17.4 $m^2/g$, 1 hour at room temperature sulfonation). In general, the particles used in Example 6 were smaller than Example 1, had different surface areas, and varying levels of sulfonation. The anion exchange resins of Example 6 were then treated in a manner similar to Example 3 except that a shorter 2×150 mm chromatography column was used to further accelerate the chromatographic separation. The chromatography columns of Example 6 was tested in an ion chromatography system similar to Example 4. Table 4 lists the relevant chromatographic system conditions for this example such as flow rate, injection volume, the gradient elution parameters, the suppressor format (for corresponding tubing diameter of the system), and applied current to the suppressor.

TABLE 4

| Column Type | Flow Rate (mL/min) | Injection Volume (µL) | Time (minutes) | KOH Concentration (mM) | AERS Format (mm)/ Current (mA) |
|---|---|---|---|---|---|
| A, B, or C of Example 6 | 0.25 | 2.5 | 0-4 | 5 | 2/31 |
| | | | 4-9 | 5-25 | |
| | | | 9-15 | 25-90 | |
| | | | 15-25 | 90 | |

The chromatograms were run using a standard solution that contains the anions listed in Table 5 below.

TABLE 5

| Peak No. | Anion | mg/L |
|---|---|---|
| 1 | Fluoride | 2.0 |
| 2 | Monochloroacetate | 10.0 |
| 3 | Monobromoacetate | 10.0 |
| 4 | Bromate | 20.0 |
| 5 | Chloride | 5.0 |
| 6 | Dichloroacetate | 30.0 |
| 7 | Sulfate | 20.0 |
| 8 | Dibromoacetate | 30.0 |
| 9 | Nitrite | 15.0 |
| 10 | Phosphate | 30.0 |
| 11 | Chlorate | 20.0 |
| 12 | Bromide | 20.0 |
| 13 | Trichloroacetate | 30.0 |
| 14 | Nitrate | 20.0 |
| 15 | Tribromoacetate | 30.0 |

Figure 11:
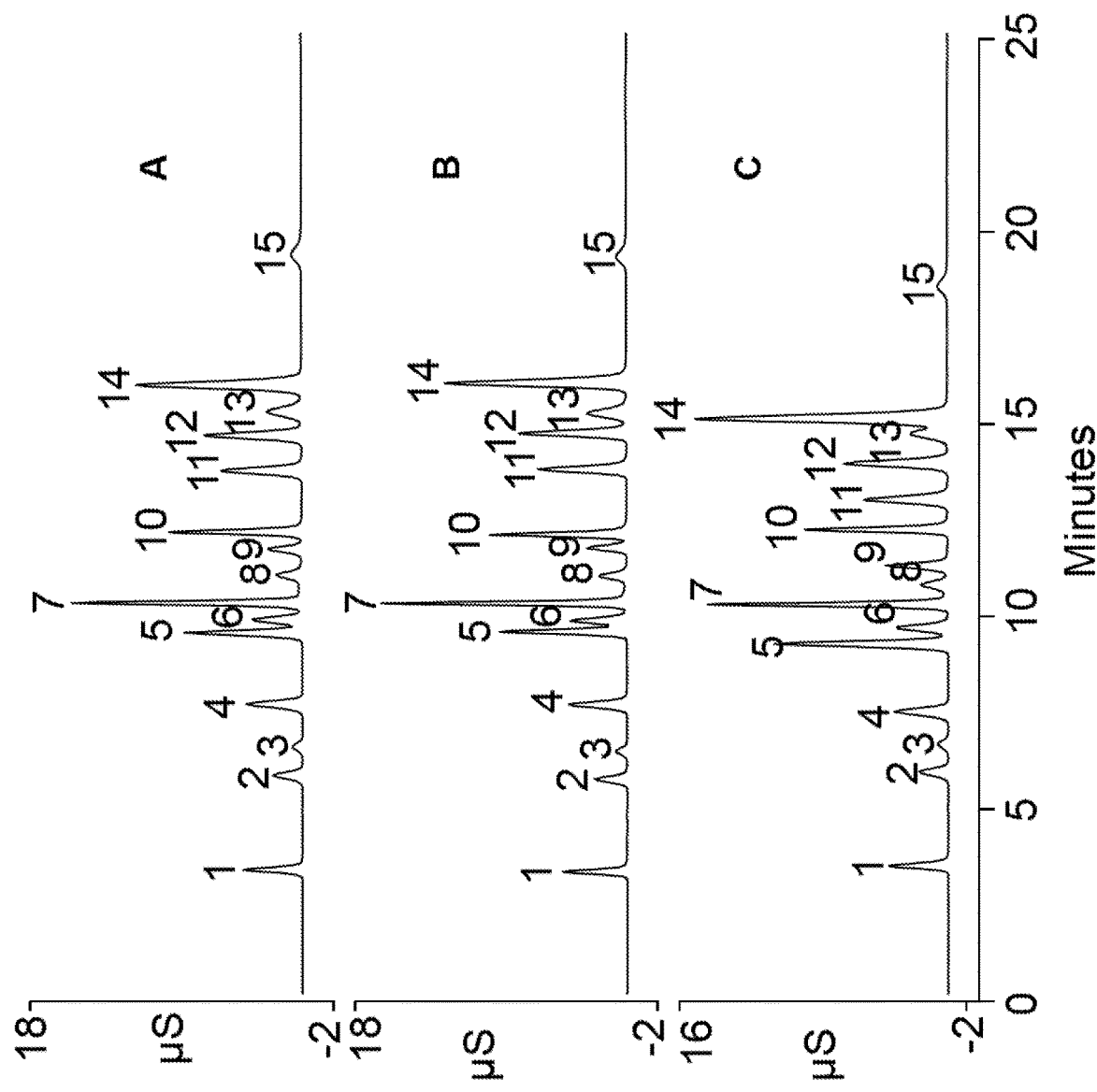
FIG. 11 illustrates three chromatograms that separated a standard solution containing 15 anions using three different anion exchange resins. The resins were synthesized with substrate particles having a diameter of about 4 to 5 microns.

FIG. 11 illustrates three chromatograms that separated a standard solution listed in Table 5 using three different anion exchange resins, which are represented as A, B, and C of this Example 6. In contrast to Example 4, the chromatograms run with anion exchange resins A, B, and C using a smaller particle size had faster run times of about 20 minutes with along with good separation. In general the chromatographic run times of Example 6 were about 10 minutes faster (50%) compared to the chromatographic run times of Example 4 (see FIG. 10).

Example 7—Chromatograms of Standard Solution Containing Nine Haloacetic Acid and Common Inorganic Anions Anion exchange resins A and C of Example 6 was tested in an ion chromatography system similar to Example 4. Table 6 lists the relevant chromatographic system conditions for this example such as flow rate, injection volume, the gradient elution parameters, the suppressor format (for corresponding tubing diameter of the system), and applied current to the suppressor.

TABLE 6

| Column Type | Flow Rate (mL/min) | Injection Volume (µL) | Time (minutes) | KOH Concentration (mM) | AERS Format (mm)/ Current (mA) |
|---|---|---|---|---|---|
| A of Example 6 | 0.25 | 2.5 | 0-4 | 4 | 2/28 |
| | | | 4-10 | 4-15 | |
| | | | 10-15 | 15-45 | |
| | | | 15-25 | 45 | |
| C of Example6 | 0.25 | 2.5 | 0-4 | 4 | 2/28 |
| | | | 4-10 | 4-18 | |
| | | | 10-15 | 18-45 | |
| | | | 15-25 | 45 | |

The chromatograms were run using a standard solution that contains 9 haloacetic acids along with common inorganic anions listed in Table 7 below.

TABLE 7

| Peak No. | Anion | mg/L |
|---|---|---|
| 1 | Fluoride | 1.0 |
| 2 | Monochloroacetate | 10.0 |
| 3 | Chlorite | 10.0 |
| 4 | Monobromoacetate | 10.0 |
| 5 | Bromate | 5.0 |
| 6 | Chloride | 1.5 |
| 7 | Dichloroacetate | 10.0 |
| 8 | Bromochloroacetate | 10.0 |
| 9 | Sulfate | 5.0 |
| 10 | Dibromoacetate | 10.0 |
| 11 | Phosphate | 10.0 |
| 12 | Chlorate | 5.0 |
| 13 | Bromide | 5.0 |
| 14 | Trichloroacetate | 10.0 |
| 15 | Nitrate | 5.0 |
| 16 | Bromodichloroacetate | 10.0 |
| 17 | Chlorodibromoacetate | 10.0 |
| 18 | Tribromoacetate | 10.0 |

Figure 12:
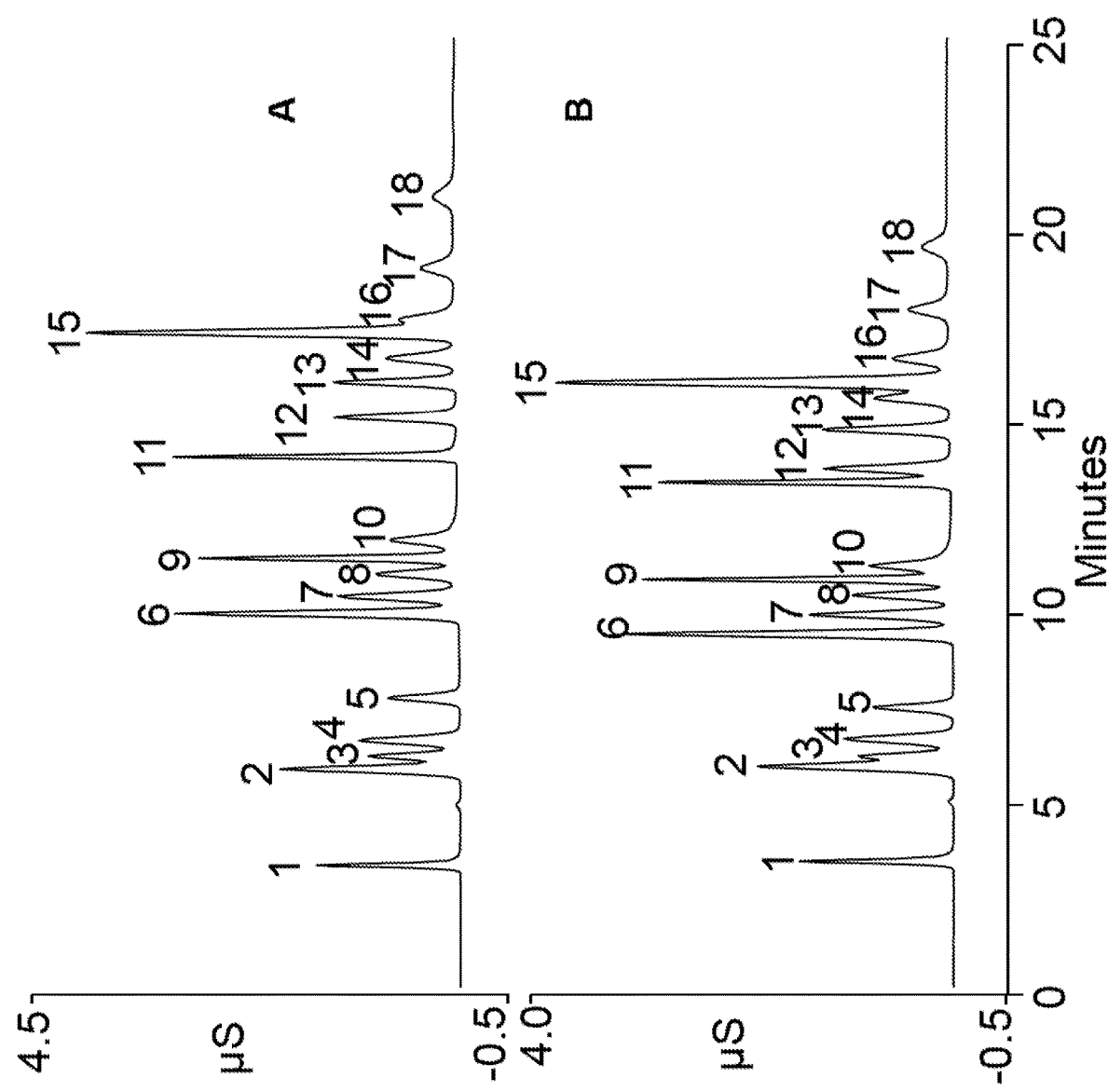
FIG. 12 illustrates two chromatograms that separated a standard solution containing 18 anions using two different anion exchange resins. The resins were synthesized with substrate particles having a diameter of about 4 to 5 microns.

FIG. 12 illustrates two chromatograms that separated the standard solution listed in Table 7 using anion exchange resins A and C of Example 6. In general, the chromatograms using A and C of Example 6 show the feasibility of resolving all 18 analytes of Table 7. Although a few of the peaks are not completely baseline resolved, Applicant believes that one or more minor adjustments such as adjusting the number of reaction cycles that form the crosslinked ethanolamine polymer layer, the number of glycidol treatments, adjusting the reaction temperature, lengthening the column, adjusting the elution gradient, and chromatographic run temperature will allow all of the peaks to be resolved in a single chromatographic run. It should be noted that not only were the chromatograms performed relatively quickly at about 20 minutes for a sample having 18 analytes of haloacetic acids and common inorganic anions, but that the eluent concentration was relatively low at less than or equal to 45 mM KOH.

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. An anion exchange stationary phase comprises:
   a) a negatively charged substrate particle;
   b) a base condensation polymer layer attached to the negatively charged substrate particle, the base condensation polymer layer comprises:
      i) first quaternary amines;
      ii) first ether groups; and
      iii) first hydroxy groups, in which at least one of the first hydroxy groups is spaced from one of the first quaternary amines by a first two carbon spacer;
   c) a crosslinked ethanolamine condensation polymer layer covalently attached to the base condensation polymer layer, the crosslinked ethanolamine condensation polymer layer comprises:
      i) second quaternary amines;
      ii) second ether groups, in which at least one of the second ether groups is spaced from one of the second quaternary amines by a second two carbon spacer; and
      iii) second hydroxy groups, in which at least one of the second hydroxy groups is spaced from one of the second quaternary amines by the first two carbon spacer; and
   d) a glycidol condensation layer covalently attached to the crosslinked ethanolamine condensation polymer layer, the glycidol condensation layer comprises: a plurality of dihydroxy groups,
   in which each dihydroxy group includes a hydroxy group and another hydroxy group, and
   the hydroxy group is spaced from the another hydroxy group by the first two carbon spacer,
   in which at least one of the hydroxy groups is spaced from one of the second quaternary amines of the crosslinked ethanolamine condensation polymer layer by the first two carbon spacer.

2. The anion exchange stationary phase of claim 1, in which the negatively charged substrate particle comprises a crosslinked divinylbenzene and ethylvinyl benzene particle, in which at least a surface of the negatively charged substrate particle includes sulfonate groups.

3. The anion exchange stationary phase of claim 1, in which the base condensation polymer layer is positively charged and ionically attached to the negatively charged substrate particle.

4. The anion exchange stationary phase of claim 1, in which the first two carbon spacer comprises a chemical formula of
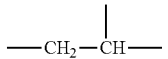
and the second two carbon spacer comprises a chemical formula of —$CH_2$—$CH_2$—.
* * * * *